Figure 3:
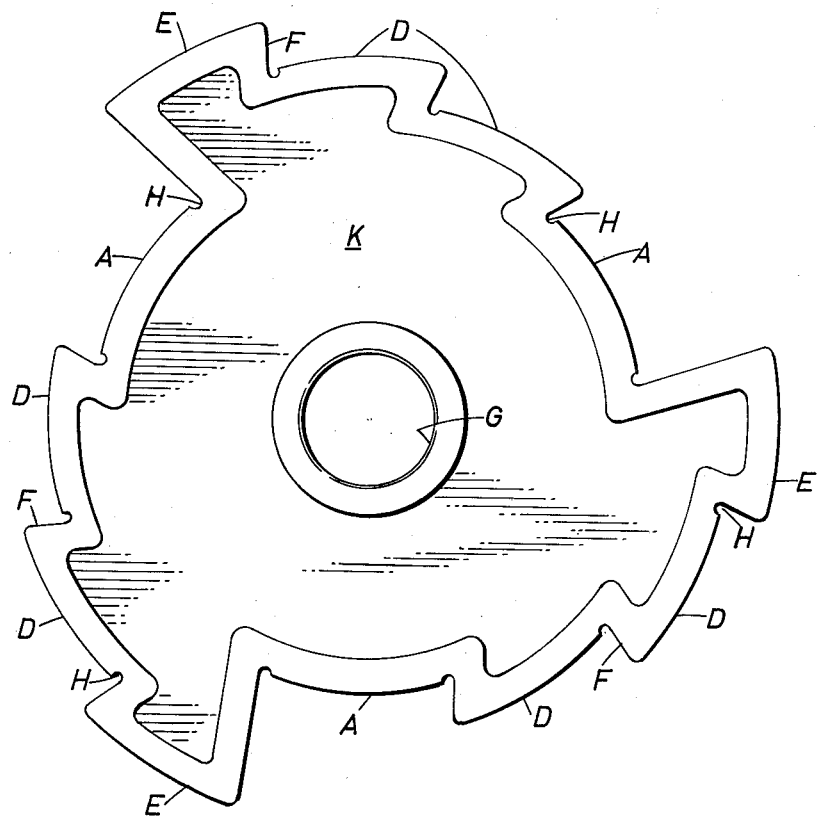

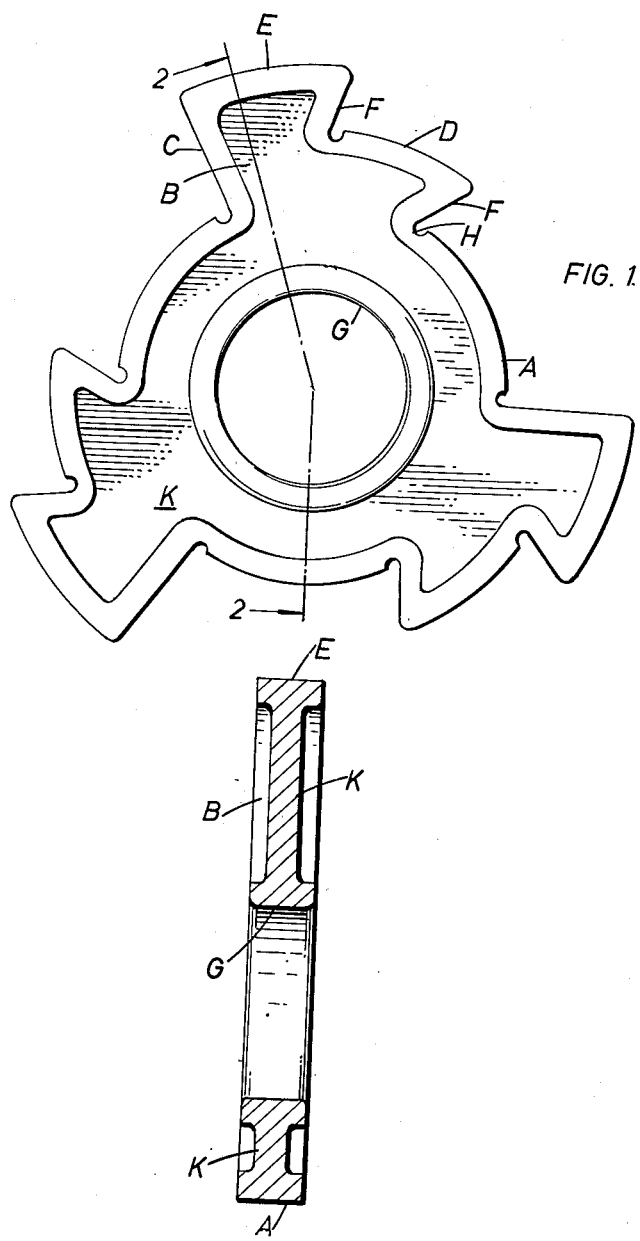

United States Patent Office

3,046,671
Patented July 31, 1962

3,046,671
TEMPLET FOR CHUCK JAWS OF LATHES
Charles Clifford Moores, Mill House Farm,
Warmingham, Sandbach, England
Filed June 18, 1958, Ser. No. 742,952
Claims priority, application Great Britain June 18, 1957
6 Claims. (Cl. 33—178)

This invention relates to the chucking of workpieces in lathes and the like, and more particularly to the preparation of universal or self-centring chuck-jaws for the reception of circular and/or other workpieces.

In order that the jaws may obtain a secure grip without risk of marking a previously machined surface on the workpiece, it is well known to form such jaws of relative soft material, or to provide them with relatively soft faces, so that they can readily be machined to a radius or shape corresponding to that of the part to be gripped thereby.

To facilitate this preliminary jaw-shaping operation, it has been the usual practice hitherto to grip between the rear parts of the jaws (i.e. immediately adjacent the chuck body) a metal disc of the appropriate diameter, a plurality of such discs in graduated sizes being stocked for use as required.

Experience shows, however, that they are liable to be lost or misappropriated in the average machine shop, so that time is wasted in searching for the correct size of disc or in preparing a substituted.

The object of the present invention is to provide an improved form of chuck-jaw templet whose use will very greatly reduce the number of such items requiring to be stocked and whose distinctive formation reduces the possibility of its being mislaid or utilized, accidentally or by design, for some unintended purpose.

According to this invention an improved templet for use in the pre-shaping of chuck-jaws comprises a plate or ring with angularly spaced peripheral portions equal in number to said jaws and having a common radius of curvature, and intervening arms or lobes with mutually corresponding profiles which exhibit stepped arcuate portions concentric with those just mentioned but differing in radius from the latter and from one another by equal increments.

The number of sets of such arcuate steps which may be provided on the arms or lobes for alternative engagement by the chuck-jaws is limited only by the fact that, for security of engagement, the total contact length provided at any given radius should exceed half the total effective width of the jaws aforesaid.

In the accompanying drawings;

FIG. 1 is a front elevation of one form of the improved templet which provides for setting of the associated chuck jaws to any of three different radii, FIG. 2 is a section on the line 2—2 of FIG. 1, and FIG. 3 is a view corresponding to FIG. 1 but showing a modified construction.

In the example illustrated in FIGS. 1 and 2, a templet for use upon a 12-inch, 3-jaw chuck is formed with a central or hub portion A, 3 inches in diameter, the periphery of such portion being divided into three equal parts long enough for individual engagement by chuck-jaws (say) 1½ inches wide and separated by sector-shaped arms B.

One edge C of each arm may be radial to the centre or hub A of the templet whilst the other is formed with a step D at half its height, this step and the free end E of the arm B being shaped to arcs of radii 2 and 2½ inches respectively.

The effective length of each arcuate surface thus provided should be greater than half the jaw width, 1¼ or 1⅜ inches being suitable, and the riser portions F above and below the steps D are preferably incut so as not to interfere with engagement of such steps or of the hub A by the chuck-jaws. For example the portions F may be tangential, or approximately so, to a hole G of 1½ inches diameter which is formed concentric with the hub A. Furthermore a suitable relief H may be provided at each re-entrant angle of the templet.

It will be appreciated that a templet shaped as above described provides alternative gripping diameters of 3, 5 and 6 inches, but obviously, as in the example shown in FIG. 3 (which provides gripping diameters of 6, 7, 8 and 9 inches) there may be more than one step D in each arm B, and/or the graduated arcuate surfaces may be arranged with a smaller radial increment than 1 inch.

It is in fact proposed to provide a set of eight templets, by means of which an operative may obtain alternative gripping radii decreasing by steps of ⅛ inch from the maximum offered by the chuck to a minimum governed by the width of the jaws and the need to provide solid metal between the centre of each arcuate surface and that of the templet.

Obviously a greater number of alternative gripping radii can be provided on a single templet if the chuck concerned has only two jaws, whilst with a 4-jaw chuck it may not be desirable to provide more than three such radii per templet if risk of deformation of the latter is to be avoided.

When the chuck whose jaws require shaping is associated with a capstan or turret lathe, the tool-holder of the latter may have secured therein a round bar which fits the central hole G in the templet and thereby centralizes the latter with reference to the chuck. With other types of lathe, of course, the templet will normally be centralized by reference to radial graduations or concentric rings on the face of the chuck whilst the jaws are being adjusted accordingly.

The templet may be sawn to shape from steel plate or other suitable material, say 7/16 of an inch thick, but it is preferred to machine-mould the same from cast iron with a relatively thin web K between its rim and that of the hole G. If extreme accuracy is desired, the arcuate surfaces may be finished by grinding.

Although the improved templet has been particularly described hereinbefore with reference to the preparation of chuck-jaws for external turning, it should be understood that the templet may be modified for internal gripping; that is to say, it may take the form of a ring having internally-directed arms or lobes each stepped to provide a plurality of alternative concave surfaces.

I claim:

1. A templet for use in the preshaping of chuck-jaws comprising a plate, angularly spaced peripheral portions extending outwardly from said plate, said portions having a common radius of curvature about the center of said plate, angularly spaced arms having a common radius of curvature less than that of said portions and concentric with said portions, said arms being interposed between said portions, one edge of said portions being approximately radial and the other edge merging into the adjacent arm.

2. A templet according to claim 1 characterized in that said other edge is undercut and tangent to a circle on said plate and concentric with said portions.

3. A templet according to claim 1 characterized in that there is a set of angularly spaced lobes having a common radius of curvature less than that of said arms and concentric with said arms, said lobes being interposed between adjacent arms and portions respectively, the radial edge of said portions merging with said lobes.

4. A templet according to claim 1 characterized in that the peripheries of said portions and arms are at least equal to one-half of the effective width of said jaws.

5. A templet according to claim 1 characterized in that one edge of each portion and arm is approximately radial to the center of said plate and the other edge is undercut.

6. A templet according to claim 3 characterized in that said portions, arms and lobes differ from each other in their radii by equal increments.

References Cited in the file of this patent

UNITED STATES PATENTS

| | | |
|---|---|---|
| 1,044,299 | Trundle | Nov. 12, 1912 |
| 1,655,905 | Kempton | Jan. 10, 1928 |
| 1,810,166 | Gallimore | June 16, 1931 |
| 2,572,013 | Cushman | Oct. 23, 1951 |

FOREIGN PATENTS

| | | |
|---|---|---|
| 16,832/01 | Great Britain | Aug. 22, 1902 |